(12) United States Patent
Beattie, Jr. et al.

(10) Patent No.: US 8,838,745 B2
(45) Date of Patent: Sep. 16, 2014

(54) SYSTEMS, METHODS AND MACHINE-READABLE MEDIUMS FOR INTEGRATED QUALITY ASSURANCE BROKERING SERVICES

(75) Inventors: James Gordon Beattie, Jr., Bergenfield, NJ (US); Daniel A. Zuckerman, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 648 days.

(21) Appl. No.: 12/637,680

(22) Filed: Dec. 14, 2009

(65) Prior Publication Data

US 2011/0145365 A1  Jun. 16, 2011

(51) Int. Cl.
*G06F 15/16* (2006.01)

(52) U.S. Cl.
USPC ............................................ 709/219; 709/217

(58) Field of Classification Search
None
See application file for complete search history.

(56) References Cited

U.S. PATENT DOCUMENTS

| 7,855,952 | B2* | 12/2010 | Yang et al. | 370/218 |
|---|---|---|---|---|
| 2002/0016835 | A1* | 2/2002 | Gamerman | 709/223 |
| 2002/0040352 | A1* | 4/2002 | McCormick | 705/80 |
| 2002/0069079 | A1* | 6/2002 | Vega | 705/1 |
| 2002/0174207 | A1* | 11/2002 | Battou | 709/223 |
| 2003/0093478 | A1* | 5/2003 | Hughes | 709/205 |
| 2003/0195813 | A1* | 10/2003 | Pallister et al. | 705/26 |
| 2004/0098467 | A1* | 5/2004 | Dewey et al. | 709/219 |
| 2005/0055599 | A1* | 3/2005 | Bravo et al. | 714/4 |
| 2005/0065821 | A1* | 3/2005 | Kalies, Jr. | 705/2 |
| 2005/0259571 | A1* | 11/2005 | Battou | 370/217 |
| 2006/0041496 | A1* | 2/2006 | Amin | 705/37 |
| 2006/0287873 | A1* | 12/2006 | Heard | 705/1 |
| 2007/0208834 | A1* | 9/2007 | Nanamura et al. | 709/220 |
| 2008/0177653 | A1* | 7/2008 | Famolari et al. | 705/37 |
| 2009/0006152 | A1* | 1/2009 | Timmerman et al. | 705/7 |
| 2009/0192945 | A1* | 7/2009 | Perpina et al. | 705/80 |
| 2010/0274682 | A1* | 10/2010 | Pai | 705/26 |

* cited by examiner

*Primary Examiner* — Brian P Whipple
(74) *Attorney, Agent, or Firm* — Hartman & Citrin LLC

(57) ABSTRACT

Systems, methods and machine-readable mediums for interfacing a plurality of service providers to address at least one service issue are provided. The systems may include a storage device and a processor. The storage device may store service provider data and service request data for a plurality of service providers. The service request data identifies at least one service issue with one or more of the plurality of service providers. The processor may be programmed to receive the service provider data from a plurality of service provider terminals, receive the service request data from at least one remote terminal, store the service provider data and the service request data in the storage device, and facilitate communication between the first service provider terminal and the customer terminal to address the at least one service issue. The computer readable mediums provide instructions to cause the processor to perform the operations above.

19 Claims, 8 Drawing Sheets

108

```
Reporting an Event
Service Details

Title
    [ I can't place an order online          ]

Category
    [ Technology                            ⌄]

Description
    ┌─────────────────────────────────────┬─┐
    │ The website is not accepting any credit card │⌃│
    │ information and freezes every time I try to  │ │
    │ submit an order                              │ │
    │                                              │⌄│
    └─────────────────────────────────────┴─┘

[Submit]  [Cancel]
```

FIG. 8

SYSTEMS, METHODS AND MACHINE-READABLE MEDIUMS FOR INTEGRATED QUALITY ASSURANCE BROKERING SERVICES

BACKGROUND

This disclosure relates generally to quality assurance programs, and particularly to systems, methods and machine-readable mediums for integrated quality assurance services among a plurality of businesses.

SUMMARY

The present disclosure provides systems, methods and machine-readable mediums for interfacing a plurality of service providers to address at least one service issue. The systems may include a storage device and a processor. The storage device may store service provider data and service request data for a plurality of service providers. The service request data identifies the at least one service issue with one or more of the plurality of service providers. In one embodiment, the processor may be programmed to receive the service provider data from a plurality of service provider terminals, and receive the service request data from at least one remote terminal. The at least one remote terminal may include at least one of a customer terminal for a customer and a first service provider terminal for a first service provider. The processor may be further programmed to store the service provider data and the service request data in the storage device, and facilitate communication between the first service provider terminal and the customer terminal to address the at least one service issue.

In one embodiment, the processor may be further programmed to facilitate communication between the first service provider terminal and at least one second service provider terminal for at least one second service provider. The at least one second service provider providing technical support to the first service provider terminal for addressing the at least one service issue with the first service provider. In one embodiment, the processor may receive a request from the first service provider terminal to solicit bids from at least one second service provider to address the at least one service issue with the first service provider, and transmit the request to at least one second service provider terminal.

In one embodiment, the processor may be programmed to query the customer terminal for customer satisfaction with the first service provider in addressing the at least one service issue, receive a customer satisfaction feedback data from the customer terminal, store the customer satisfaction feedback data in the storage device, and report the customer satisfaction feedback data to the first service provider terminal.

The present disclosure also provides computer-implemented methods interfacing a plurality of service providers to address at least one service issue. The computer-implemented methods include receiving a service provider data from a plurality of service provider terminals, receiving a service request data from at least one remote terminal and storing the service provider data and the service request data in a storage device. The computer-implemented methods may further include interfacing communication between the first service provider terminal and the at least one remote terminal to address the at least one service issue.

The computer readable mediums provide instructions to cause the processor to perform the operations above.

Many features and embodiments of the present invention will be apparent from the accompanying drawings and from the following detailed description.

DRAWINGS

The above-mentioned features and objects of the present disclosure will become more apparent with reference to the following description taken in conjunction with the accompanying drawings wherein like reference numerals denote like elements and in which:

FIG. 8 illustrates an exemplary screen for reporting an event, according to an embodiment of the present disclosure.

DETAILED DESCRIPTION

Figure 1:
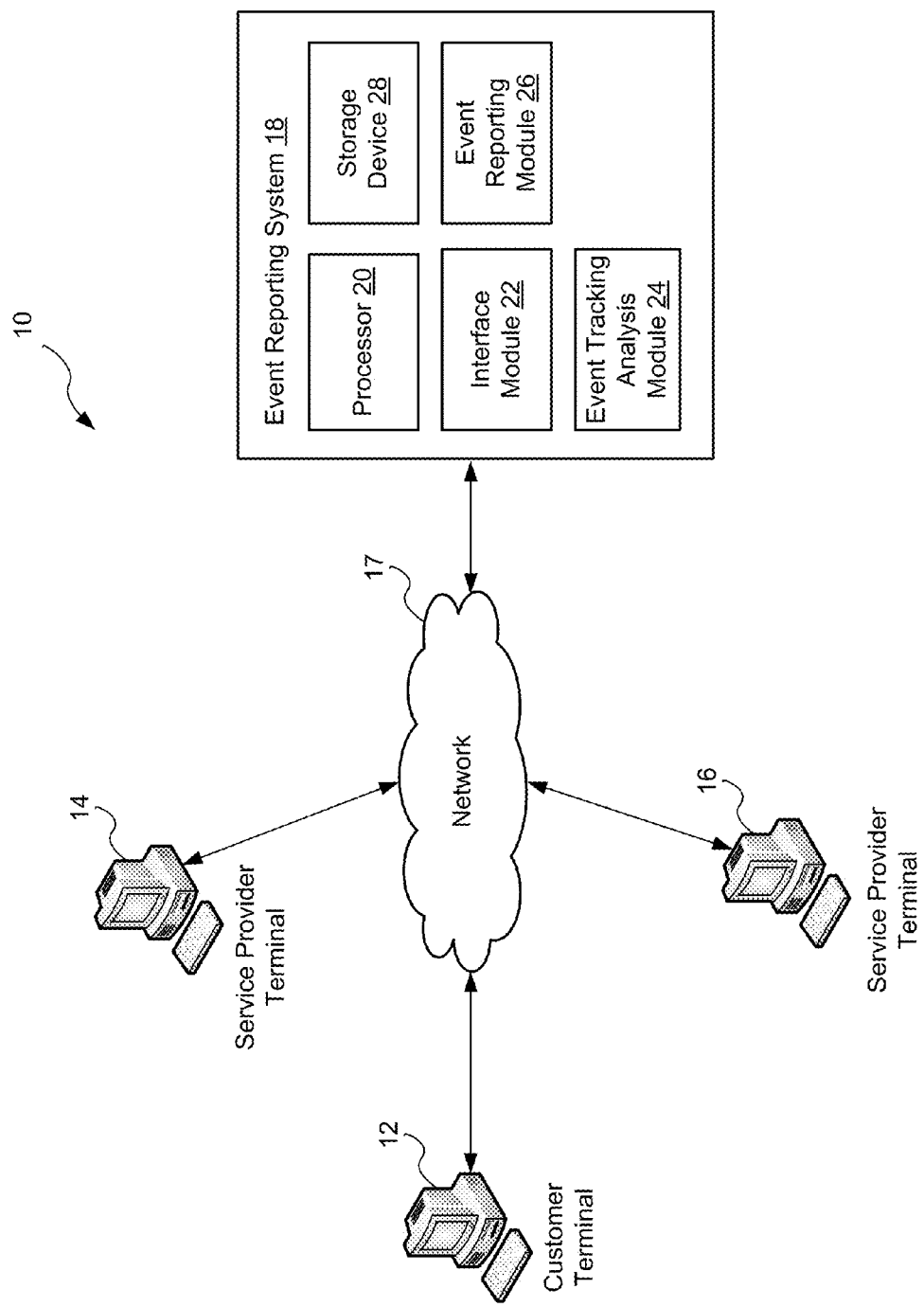
FIG. 1 illustrates an exemplary block diagram of a system for interfacing a plurality of service providers to address at least one service issue, according to an embodiment of the present disclosure.

In the following description, for purposes of explanation, numerous specific details are set forth in order to provide a thorough understanding of the description. It will be apparent, however, to one skilled in the art that embodiments of the disclosure can be practiced without these specific details. In other instances, structures and devices are shown in block diagram form in order to avoid obscuring the description.

Reference in this specification to "one embodiment", "an embodiment", "other embodiments", or the like means that a particular feature, structure, or characteristic described in connection with the embodiment is included in at least one embodiment of the disclosure. The appearances of, for example, the phrase "in one embodiment" in various places in the specification are not necessarily all referring to the same embodiment, nor are separate or alternative embodiments mutually exclusive of other embodiments.

Moreover, whether or not there is express reference to an "embodiment" or the like, various features are described which may be exhibited by some embodiments and not by others. Similarly, various requirements are described which may be requirements for some embodiments but not other embodiments.

When service providers detect a problem with their service, either through internal detection mechanisms or through customer complaints, they generally coordinate their internal and external resources in the restoration of the service. One embodiment of the present disclosure provides a system for enhancing the service providers' ability to more rapidly and effectively respond to customer needs and reactions in the marketplace. The system may be used to assist service providers with their regulatory or contractual compliance requirements by providing an outside unbiased entity and mechanism to assure transparency.

The complexity of coordination of multiple organizations required to bring to bear the required resolution resources for complex service restoration often leads to a waste of time and expense by parties who are unable to bring about service restoration on their own. In one embodiment, the present disclosure provides a system with a universal database and standardized interfaces that allow for an event reporting and coordination of systems and personnel needed to resolve outages and discords in services provided by companies to their customers. The system may include a universal database of provider and customer reported issues and business transaction via standardized interfaces that could be combined to reduce outage or discord time and the related costs.

One aspect of the invention is the standardization of the database and interface to allow a third party (broker) to host the program for various entities (service providers) in an industry. When the invention is used, there is no need to run separate programs/databases for different entities. Standardization allows the industry to pool similar needs in the same platform. Thus, the platform can run at a large scale and thus at a reduced cost, comparing to each entity running their own quality assurance programs.

FIG. 1 illustrates an exemplary block diagram of a system 10 for interfacing a plurality of service providers to address at least one service issue, according to an embodiment of the present disclosure. The service issue may be any problem associated with the performance of a service, for example, a disruption in service, a delivery problem, or a scheduling problem, as further discussed below. As shown in FIG. 1, an event reporting system 18 may be accessible to at least one customer terminal 12, and a plurality of service provider terminals 14 and 16, such as personal computers, phones and personal digital assistants, via a network 17. The event reporting system 18 may be administered or managed by a third party/"broker" to coordinate reporting and resolution of service issues for companies across multiple industries. For example, service provider terminal 14 may be a computer terminal of a company in the retail industry while service provider terminal 16 may be a computer terminal of a company in the computer software industry. The terminals 12, 14, and 16 may run commercially-available Web browser applications such as Microsoft Internet Explorer®, which implements World Wide Web standards such as HTTP, HTML, XML, java, Flex, Ajax and the like.

In one embodiment, the event reporting system 18 may include a processor 20, one or more modules and one or more storage devices 28. The website content may be distributed over several Internet domains, and may be implemented using several servers located at various locations. Of course, a variety of networks, both public and private, may be used as well. The event reporting system 18 may use a commercially-available Internet server which accesses a web page database that may be used to store and/or dynamically generate Web pages in response to end user actions. The Web pages may be in the form of HTML pages or the like.

The processor 20 may implement one or more functional modules, such as an interface module 22, an event tracking and analysis module 24, and an event reporting module 26. As used herein, the term module refers to logic implemented in hardware and/or software. It may include a collection of software instructions, possibly having entry and exit points, written in a programming language, such as, for example, C++. A software module may be compiled and linked into an executable program, or installed in a dynamic link library, or may be written in an interpretive language such as BASIC. It will be appreciated that software modules may be callable from other modules, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays. The modules described herein are preferably implemented as software modules, but could be represented in hardware or firmware.

In one embodiment, each module may be a modular code object, where the code objects typically interact through a set of standardized function calls. In one embodiment, the code objects are written in a suitable software language such as C++, but the code objects can be written in any low level or high level language. In one embodiment, the code modules are implemented in C++ and compiled on a computer running a content server, such as, for example, Microsoft® IIS or Linux® Apache. Alternatively, the code modules can be compiled with their own front end on a kiosk, or can be compiled on a cluster of server machines and transmitted through a cable, packet, telephone, satellite, or other telecommunications network. Artisans of skill in the art will recognize that any number of implementations, including code implementations directly to hardware, are also possible.

The interface module 22 may interface any communication with the event reporting system 18. In one embodiment, the interface module 22 may facilitate communication between the plurality of service provider terminals 14 and the customer terminal 12 to address at least one service issue. The interface module 22 may also facilitate communication between a first service provider terminal 14 and at least one second service provider terminal 16. In one embodiment, the interface module 22 may receive an identifier, such as an account username and password, for logging onto the event reporting system 18 and for accessing associated service provider account. By logging onto the event reporting system 18, service providers may securely access reports, notifications and service requests from one or more customers, and/or other related communication from other service providers.

The event reporting module 26 may receive service request data identifying at least one service issue with one or more of the plurality of service providers. The service request data may include one or more reports identified below. In one embodiment, the event reporting module 26 receives the service request data from at least one customer terminal 12 and/or a first service provider terminal 14. If one customer terminal 12 provides the service request data, the event reporting module 26 may report the at least one service issue to other customer terminals 12 and to the first service provider terminal 14. If the first service provider terminal 14 provides the service request data, the event reporting module 26 may report the at least one service issue to at least one customer terminal 12 and/or a second service provider terminal 16. In one embodiment, the event reporting module 26 may also report to the customer terminal 12 and/or the first service provider terminal 14 when the at least one service issue is addressed. As is understood by persons skilled in the art, a service issue may be addressed in several different ways by a service provider including, but not limited to, merely communicating with a customer in connection with the at least one service issue, dealing with and/or resolving the at least one service issue.

As can be appreciated, a service provider may request support from another service provider. In one embodiment, the event reporting system 18 facilitates communication between the first and second service providers to address the at least one service issue. For example, the event reporting system 18 may receive a request from the first service provider terminal 14 to solicit bids from at least one second service provider 16 to address the at least one service issue with the first service provider, and transmit the request to at least one second service provider terminal 16. In one embodiment, the event reporting module 26 may provide the following information in a requesting provider report: Requesting Provider, Service, Element, Date & Time, Status, Report Description Data, Supporting Provider, Requested Action, and Expected Response Interval. The event reporting module 26 may also provide the following information in a supporting provider response: Requesting Provider, Service, Element, Date & Time, Reply Status, Supporting Provider, Response Action, Response Action Interval, and Response Description Data.

Similarly, a customer may use the event reporting system 18 to report a service issue. The event reporting system 18 may interface a dialogue for notifications originating with the impacted customer/user community. In one embodiment, the event reporting module 26 may provide the following information in a requesting customer report: Requesting Customer, Service, Element, Date & Time, Status, Report Description Data, Supporting Provider, Requested Action, and Expected Response Interval. In one embodiment, the event reporting module 26 may also provide the following information in a supporting provider response: Requesting Customer, Service, Element, Date & Time, Reply Status, Supporting Provider, Response Action, Response Action Interval, and Response Description Data.

Furthermore, as noted above, a service provider may utilize the event reporting system 18 to notify a customer of a service outage or discord. The event reporting system 18 may interface a dialogue for notifications originating with the service provider.

In one embodiment, the event reporting module 26 may provide the following information in a requesting customer report: Notifying Provider, Service, Element, Date & Time, Status, Report Description Data, Supported Customer/Customer Community, Requested Action, and Expected Response Interval. In one embodiment, the event reporting module 26 may also provide the following information in a customer response: Notifying Provider, Service, Element, Date & Time, Reply Status, Supported Customer/Customer Community, Response Action, Response Action Interval, and Response Description Data.

The event tracking and analysis module 24 may track service performance of a plurality of service providers 14, 16. The event tracking and analysis module 24 may also query the customer terminal 12 for customer satisfaction with the first service provider 14 for any particular service provided and/or in addressing the at least one service issue. The event tracking and analysis module 24 may then receive a customer satisfaction feedback data from the customer terminal 12. As can be appreciated, the event tracking and analysis module 24 may be operatively associated with the event reporting module 26 to report the customer satisfaction feedback data to the first service provider terminal 14. In one embodiment, the event tracking and analysis module 24 may also measure usage, response time, expense, and related marketing or regulatory data. By standardizing the exchange of data, economies of scale could reduce the costs associated with such operations and allow for multi-purpose application of this data.

In one embodiment, any portion of the storage device 28 can be provided externally from the system 18, either locally to the event reporting system 18 or remotely over the network 17. The external data from an external storage device can be provided in any standardized form which the processor 20 can understand. For example, an external storage device at a provider can advantageously provide content material in response to requests from the processor 20 in a standard format, which the processor 20 may then transform into a function call format that a code module(s) can understand. The processor 20 may be a standard SQL server, where dynamic requests from the server builds forms from one or more databases used by the system 18 as well as store and retrieve related data on the storage device 28.

As can be appreciated, the storage device 28 may be used to store, arrange and retrieve data. The storage device 28 may be a machine-readable medium, which may be any mechanism that provides (i.e. stores and/or transmits) information in a form readable by the processor 20. For example, the machine-readable medium may be a read only memory (ROM), a random access memory (RAM), a cache, a hard disk drive, a floppy disk drive, a magnetic disk storage media, an optical storage media, a flash memory device or any other device capable of storing information. Additionally, machine-readable medium may also comprise computer storage media and communication media. Machine-readable medium includes volatile and non-volatile, removable and non-removable media implemented in any method or technology for storage of information such as computer-readable instructions, data structures, program modules or other data. Machine-readable medium also includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by a computer.

In one embodiment, the storage device 28 may store service provider data and service request data for a plurality of service providers. The service request data identifying the at least one service issue with one or more of the plurality of service providers. The service provider data may include account information, such as but not limited to, account username and password, service provider name and address, service provided, events reported and other related communication for each service provider.

Figure 6:
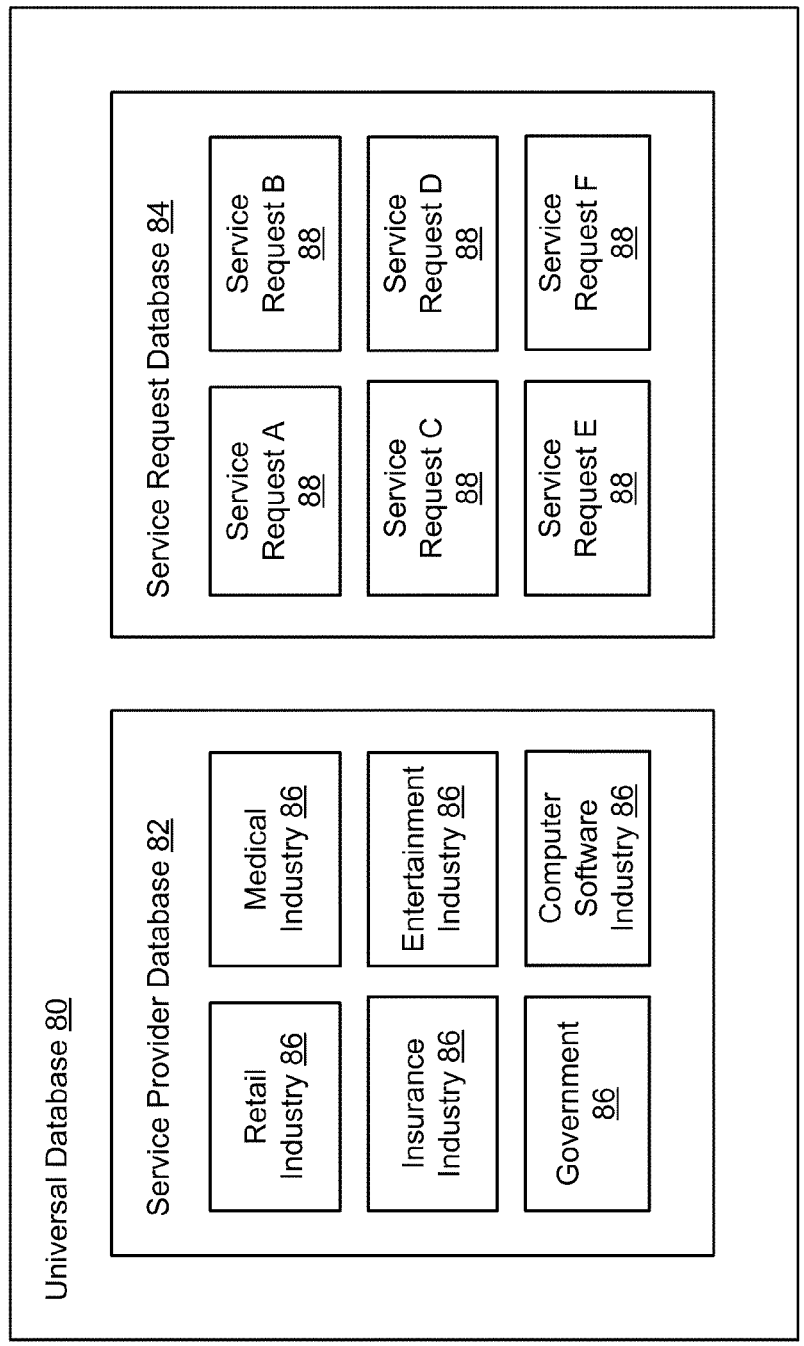
FIG. 6 illustrates an exemplary universal database stored in the storage device of FIG. 1, according to an embodiment of the present disclosure.

As can be appreciated, the service provider data for the plurality of service providers across multiple industries may be stored in a universal database. FIG. 6 illustrates an exemplary universal database 80 stored in the storage device 28, according to an embodiment of the present disclosure. The universal database 80 may include a service provider database 82 and a service request database 84. The service provider database 82 may include data entries 86 for a plurality of service providers across multiple industries, for example, retail industry, medical industry, insurance industry, entertainment industry, computer software industry and government. The service request database 84 may include data entries 88, each identifying a service issue with a service provider from one of the industries in the service provider database 82.

Figure 2:
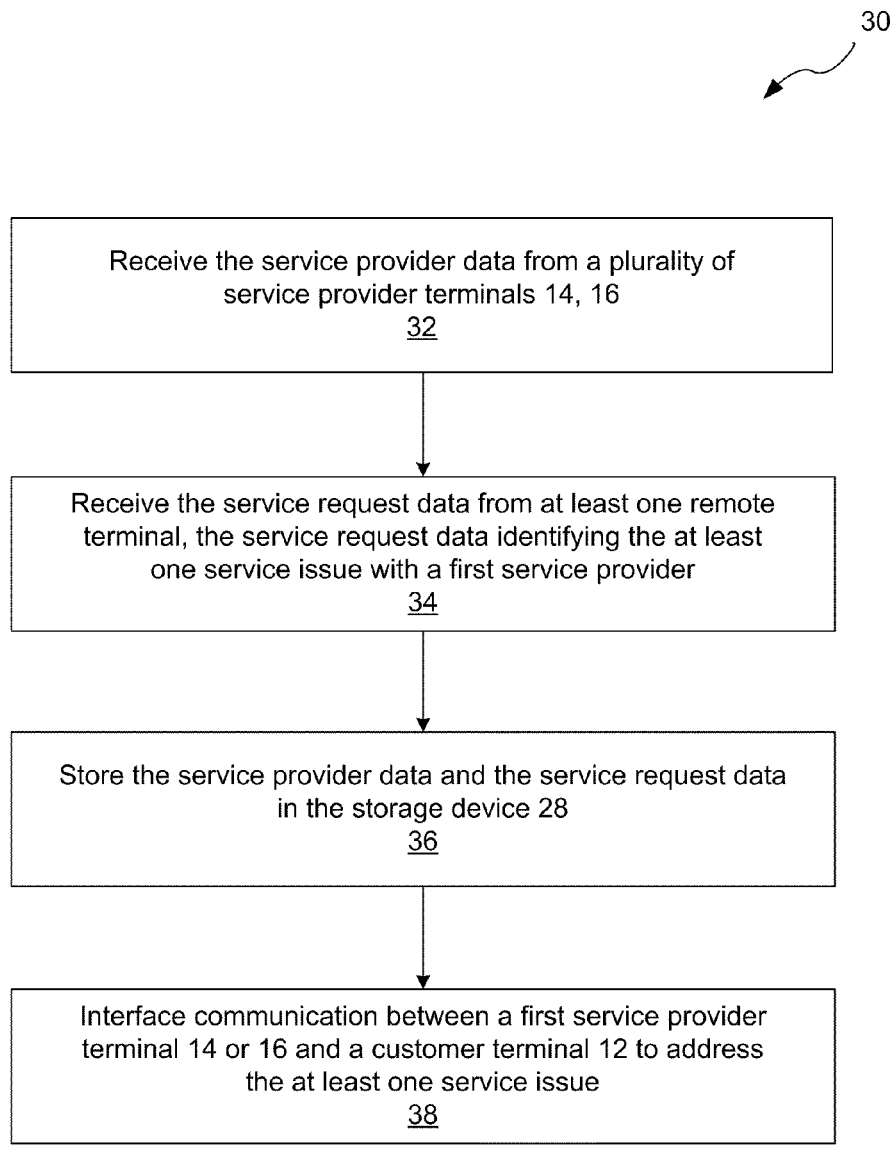
FIG. 2 illustrates an exemplary flow chart outlining the operation of the event reporting system of FIG. 1, according to an embodiment of the present disclosure.

As noted above, the event reporting system 18 may be administered or managed by a third party/"broker" to coordinate reporting and resolution of service issues for companies across multiple industries. FIG. 2 illustrates an exemplary flow chart 30 outlining the operation of the event reporting system 18 of FIG. 1, according to an embodiment of the present disclosure. As can be appreciated, the processor 20 of the event reporting system 18 may be programmed with instructions to receive the service provider data from the plurality of service provider terminals 14, 16 (32), and receive the service request data from at least one remote terminal (34). The at least one remote terminal may include at least one of the customer terminal 12 and the first service provider terminal 14. The service request data may identify the at least one service issue with a first service provider. The processor 20 may be further programmed with instructions to store the service provider data and the service request data in the universal database 80 of the storage device 28 (36). Furthermore, the processor 20 may be operatively associated with the interface module 18 to interface communication between the first service provider terminal 14 or 16 and the customer terminal 12 to address the at least one service issue (38).

Figure 7:
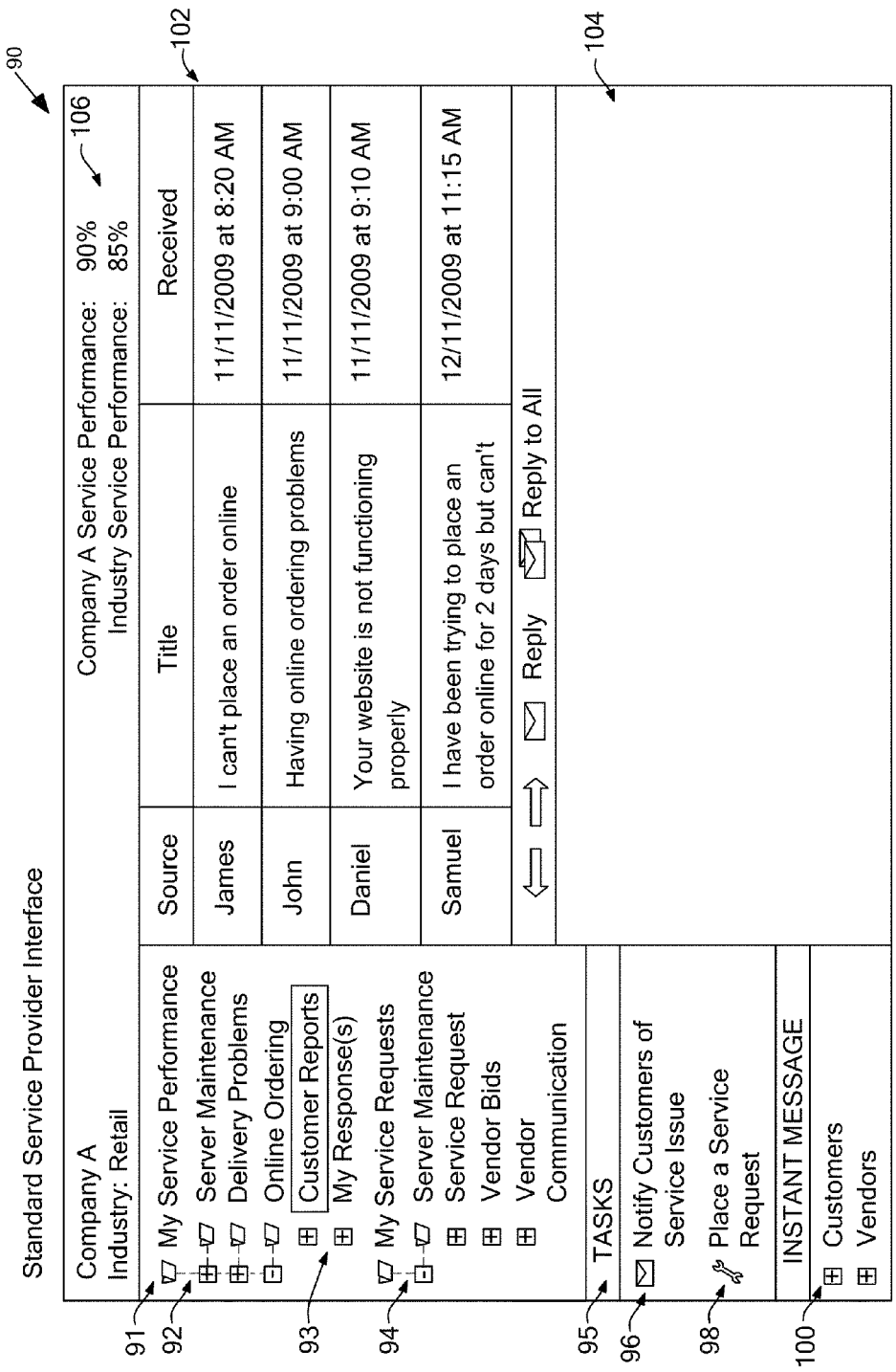
FIG. 7 illustrates an exemplary standardized service provider interface provided by the event reporting system of FIG. 1, according to an embodiment of the present disclosure.

In one embodiment, the event reporting system 18 may facilitate communication using a standardized user interface accessible to service providers and their customers via the network 17. FIG. 7 illustrates an exemplary standardized service provider interface 90 provided by the event reporting system 18 of FIG. 1, according to an embodiment of the present disclosure. The standardized service provider interface 90 may be used to provide a standard unified platform for service providers to identify service issues, report service issues, place service requests to one or more vendors, and communicate with customers in connection with the service issues.

In one embodiment, the standardized service provider interface 90 may include one or more window interfaces. One window interface 91 may include a list of a company's service performance issues 92 and related customer reports and responses 93. This information may be organized in folders and subfolders as shown in FIG. 7. When a customer reports folder is selected, a list of customer reports may display in another window interface 102 that organizes the information, for example, by source, title and time received. The content of each customer report may be viewed individually in window interface 104.

Interface window 91 may also include a list of service requests 94 submitted to vendors for pricing, bidding and/or servicing. Another interface window 95 may include a list of tasks available for the service provider, for example, notify customers of service issue 96 and place a service request 98. In one embodiment, the standardized service provider interface 90 may facilitate communication with a service provider's customers and vendors via an instant messaging interface 100.

As can be appreciated, the standardized service provider interface 90 may also provide industry specific information to allow the company to gauge its performance relative to the industry. For example, interface window 106 shows Company A has a service performance of 90% while the industry service performance is at 85%. This may be a measure of customer feedback and/or response time to address one or more service issues.

Figure 3:
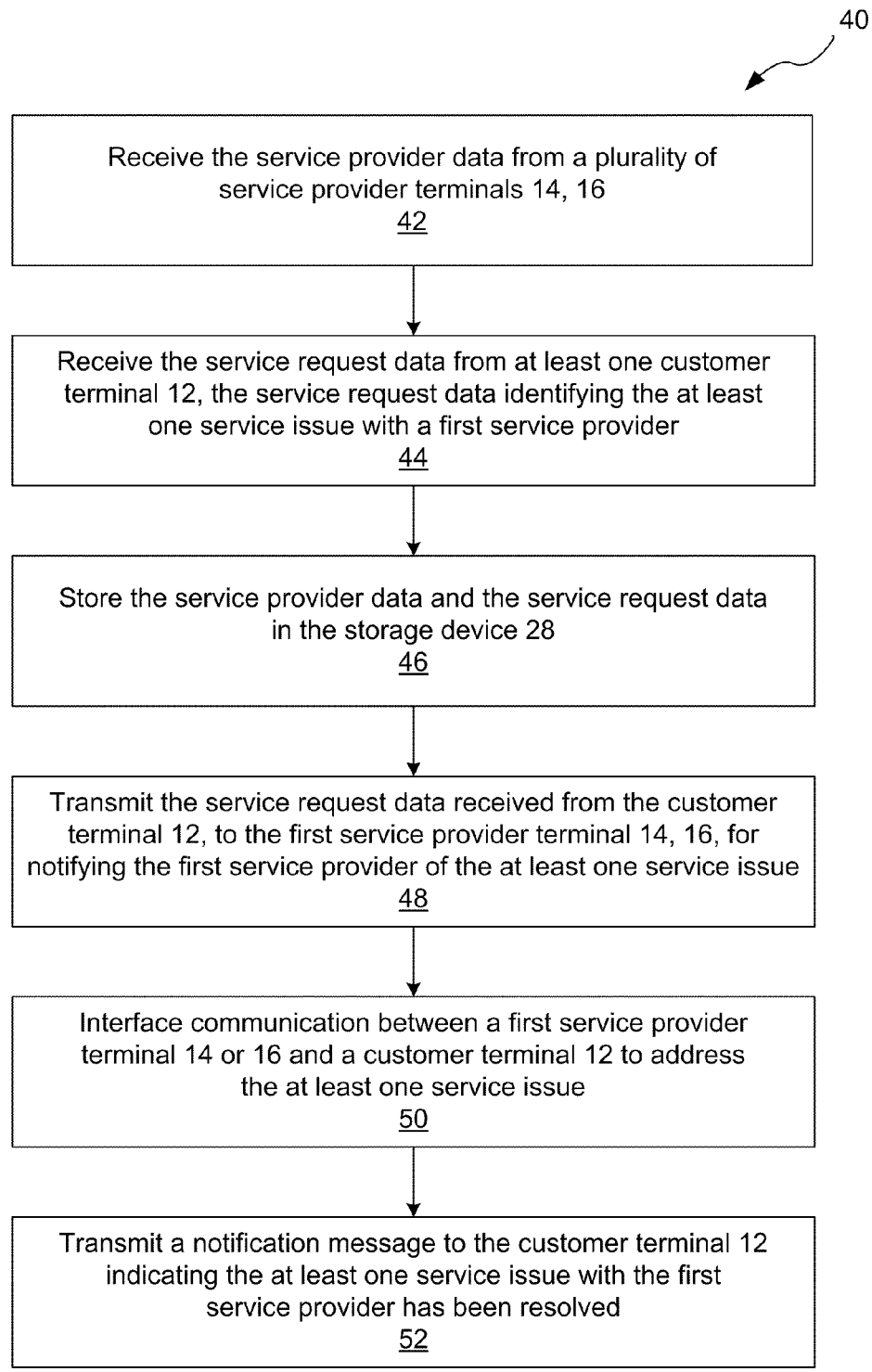
FIG. 3 illustrates an exemplary flow chart outlining the operation of the event reporting system of FIG. 1 when at least one service issue is provided by a customer, according to an embodiment of the present disclosure.

FIG. 3 illustrates an exemplary flow chart 40 outlining the operation of the event reporting system 18 of FIG. 1 when at least one service issue is provided by a customer, according to an embodiment of the present disclosure. As can be appreciated, the processor 20 may be programmed with instructions to receive the service provider data from a plurality of service provider terminals 14, 16 (42), and receive the service request data from at least one customer terminal 12 (44). The processor 20 may be further programmed with instructions to store the service provider data and the service request data in the universal database 80 of the storage device 28 (46). Furthermore, the processor 20 may be programmed with instructions to transmit the service request data received from the customer terminal 12, to the first service provider terminal 14, 16, for notifying the first service provider of the at least one service issue (48). The processor 20 may interface communication between the first service provider terminal 14 and the customer terminal 12 to address the at least one service issue (50). In one embodiment, the processor 20 may also transmit a notification message to the customer terminal 12 indicating the at least one service issue with the first service provider has been resolved (52).

Figure 4:
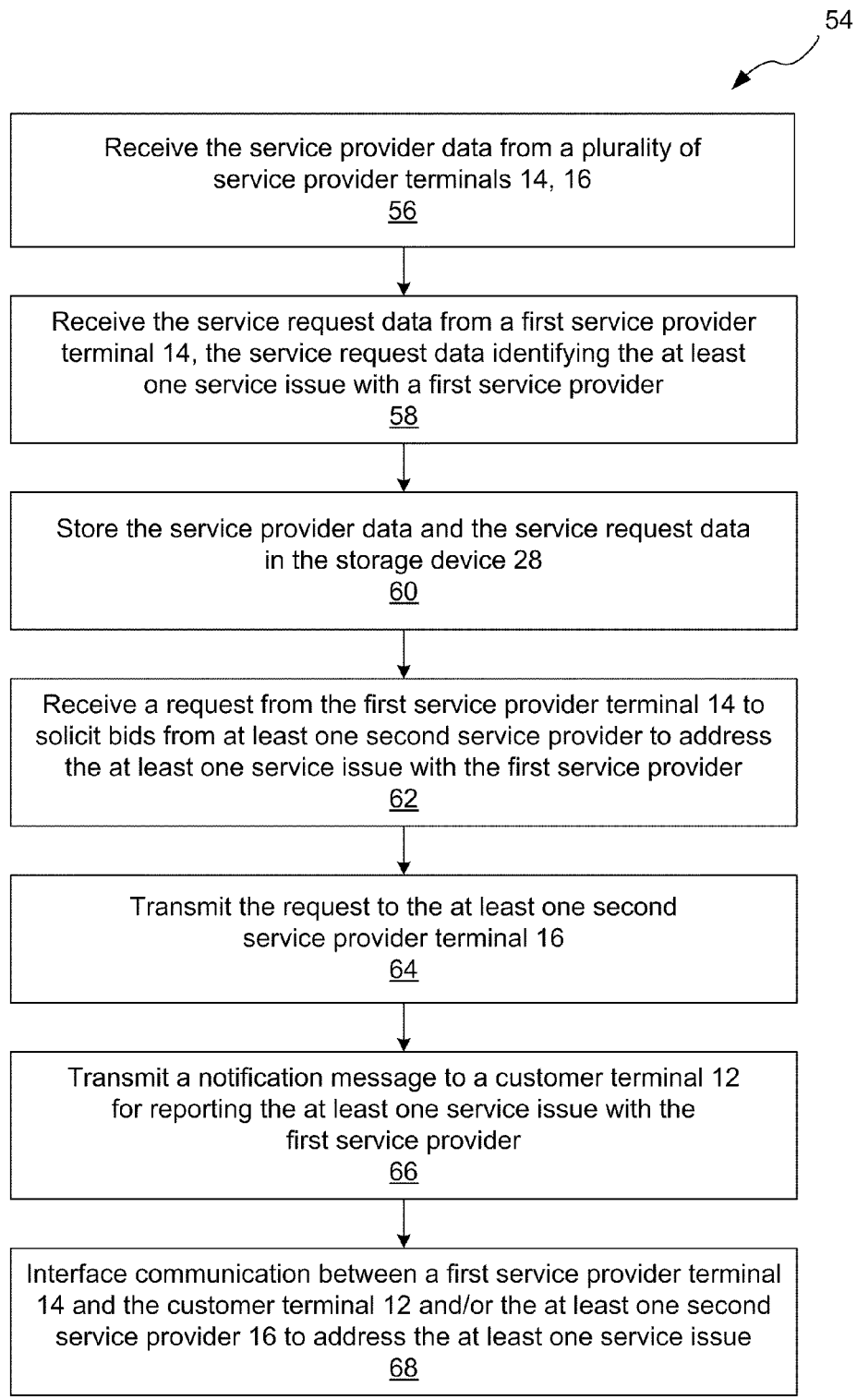
FIG. 4 illustrates an exemplary flow chart outlining the operation of the event reporting system of FIG. 1 for requesting support to address at least one service issue, according to an embodiment of the present disclosure.

As can be appreciated, the third party event reporting system 18 may be used to coordinate efforts in addressing one or more service issues for a service provider. A service provider in one industry may utilize the event reporting system 18 to request support or assistance from another service provider/vendor in another industry. FIG. 4 illustrates an exemplary flow chart 54 outlining the operation of the event reporting system 18 of FIG. 1 for requesting support to address at least one service issue, according to an embodiment of the present disclosure. The processor 20 may be programmed with instructions to receive the service provider data from a plurality of service provider terminals 14, 16 (56), and receive the service request data from the first service provider terminal 14 and/or at least one customer terminal 12 (58). The service request data may, for example, identify a problem with online ordering system of a company in the retail industry. The processor 20 may be programmed with instructions to store the service provider data and the service request data in the universal database 80 of the storage device 28 (60).

In one embodiment, the first service provider in the retail industry may request support from a second service provider in the computer software industry through direct communication via the event reporting system 18. If the first service provider is unaware of anyone to provide support for addressing the service issue, the first service provider may utilize a bidding process to identify and select a second service provider with a cost estimate for addressing the service issue. The processor 20 may be programmed with instructions to receive a request from the first service provider terminal 14 to solicit bids from at least one second service provider to address the at least one service issue with the first service provider (62), and transmit the request to the at least one second service provider terminal 16 (64). As can be appreciated, the processor 20 may further transmit a notification message to a customer terminal 12 for reporting the at least one service issue with the first service provider (66). The processor 20 may further interface communication between a first service provider terminal 14 and the customer terminal 12 and/or the at least one second service provider 16 to address the at least one service issue (68).

Figure 5:
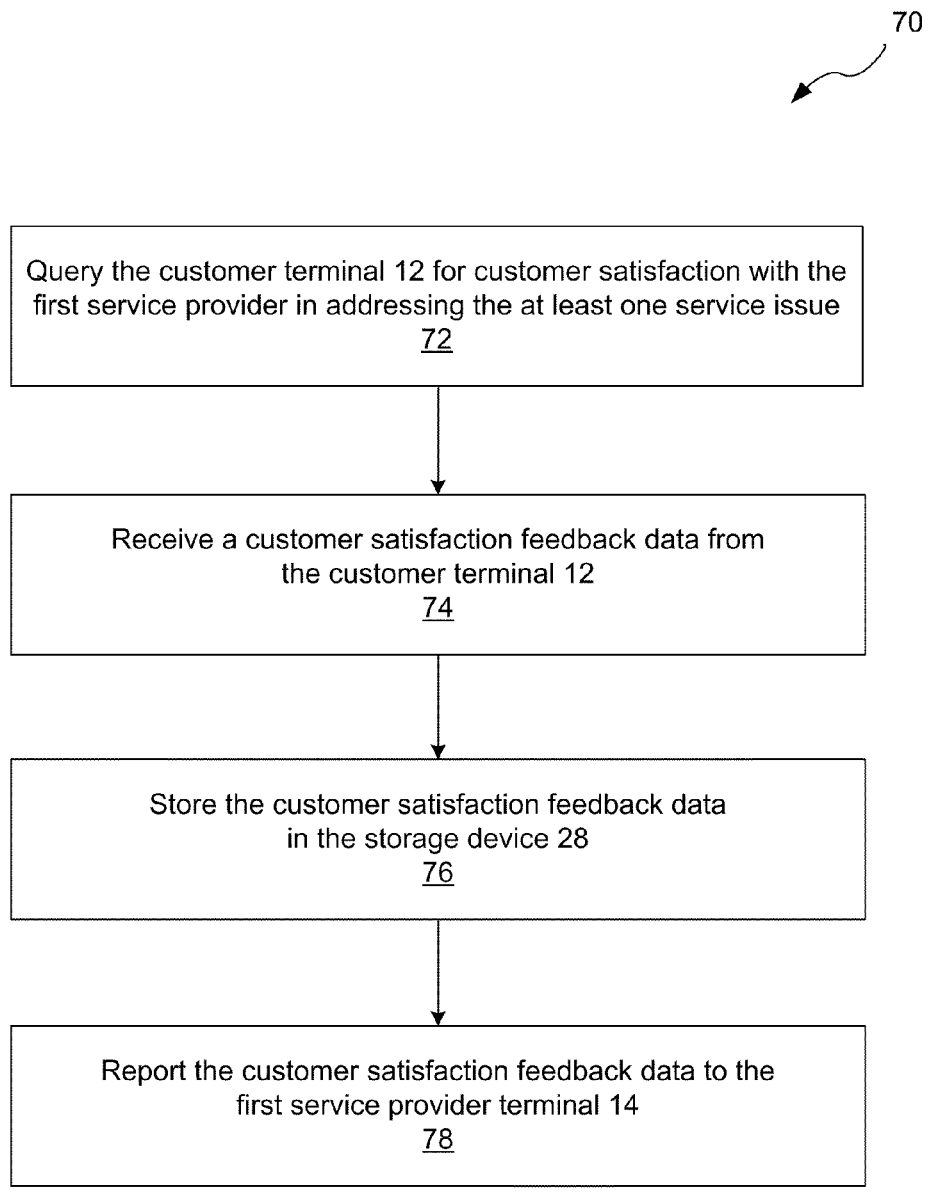
FIG. 5 illustrates an exemplary flow chart outlining the operation of the event reporting system of FIG. 1 for soliciting customer feedback on service performance and/or resolution of service issues, according to an embodiment of the present disclosure.

FIG. 5 illustrates an exemplary flow chart 70 outlining the operation of the event reporting system 18 of FIG. 1 for soliciting customer feedback on service performance and/or resolution of service issues, according to an embodiment of the present disclosure. The processor 20 may be programmed with instructions to query the customer terminal 12 for customer satisfaction with the first service provider in addressing the at least one service issue (72), and receive a customer satisfaction feedback data from the customer terminal 12 (74). The processor may then store the customer satisfaction feedback data in the storage device 28 (76) and report the customer satisfaction feedback data to the first service provider terminal 14 (78). As is understood by persons skilled in the art, a query for evaluating a service provider's performance may be transmitted to the customer terminal 12, analyzed, stored and reported in a similar fashion.

FIG. 8 illustrates an exemplary screen 108 for reporting an event, according to an embodiment of the present disclosure. A customer or service provider may input information in the available entry fields to describe and report an event, such as a service issue. If the information is inputted by a customer, the information may then be reported to the service provider via the third party event reporting system 18. Alternatively, if the information is inputted by a service provider, the information may then be reported to its customers and/or vendors via the third party event reporting system 18.

In one embodiment, the event reporting system 18 may be implemented in a brokering service to broker communication among the parties required to resolve a service issue, and between a service provider and impacted customers or users. Furthermore, it may be used to broker or mediate correlation between the provider's service reliability and the customer experience which increases the transparency of the business relationship and the service quality, and improves the confidence in market survey data resulting from this system 18. As can be appreciated, the event reporting system 18 may be used for any transaction-based business, or set of businesses, or operations within a business that requires unbiased tracking of service performance would benefit from this invention. For example, but not limited to, on-demand & streaming entertainment services, home shopping and delivery, medical services scheduling and delivery, service trouble notification and reporting, product and political promotion and response reporting, and regulatory & contractual compliance.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system. While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time. Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

The computer-readable media may store the instructions. In general, a tangible machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system. Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The disclosure includes methods and apparatuses which perform these methods, including data processing systems which perform these methods, and computer readable media containing instructions which when executed on data processing systems cause the systems to perform these methods.

While the methods and systems have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

It should also be understood that a variety of changes may be made without departing from the essence of the invention.

Such changes are also implicitly included in the description. They still fall within the scope of this invention. It should be understood that this disclosure is intended to yield a patent covering numerous aspects of the invention both independently and as an overall system and in both method and apparatus modes.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these.

Particularly, it should be understood that as the disclosure relates to elements of the invention, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this invention is entitled.

It should be understood that all actions may be expressed as a means for taking that action or as an element which causes that action.

Similarly, each physical element disclosed should be understood to encompass a disclosure of the action which that physical element facilitates.

In this regard it should be understood that for practical reasons and so as to avoid adding potentially hundreds of claims, the applicant has presented claims with initial dependencies only.

To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive forms so as to afford the applicant the broadest coverage legally permissible in accordance with the following claims.

The invention claimed is:

1. A system comprising:
    a processor; and
    a memory storing instructions that, when executed by the processor, cause the processor to perform operations comprising
        receiving, from a first service provider, first service provider data, the first service provider data comprising information regarding a service provided by the first service provider, the first service provider corresponding to a first service industry,
        receiving, from a second service provider, second service provider data, the second service provider corresponding to a second service industry, wherein the first service industry and the second service industry are different,
        receiving, from a customer, service request data identifying a problem associated with a performance of the service provided by the first service provider,
        in response to receiving the service request data, reporting the service request data to the first service provider and to other customers,
        receiving, from the first service provider, a request for support to address the problem associated with the performance of the service provided by the first service provider,
        in response to receiving the request, soliciting bids from a plurality of service providers to address the problem associated with the performance of the service provided by the first service provider, wherein the second service provider is one of the plurality of service providers, and
        transmitting, to the customer, a notification message that the problem associated with the performance of the service provided by the first service provider has been resolved.

2. The system of claim 1, the service request data is reported to the first service provider via a service provider interface.

3. The system of claim 2, wherein the service provider interface comprises a window interface including the problem associated with the performance of the service provided by the first service provider, information associated with the customer who provided the service request data identifying the problem, and a date and time when the service request data was received.

4. The system of claim 2, wherein the service provider interface provides an option for communicating with customers of the first service provider via an instant messaging interface.

5. The system of claim 1, wherein the operations further comprise determining a response time associated with addressing the problem associated with the performance of the service provided by the first service provider.

6. The system of claim 1, wherein the operations further comprise:
    querying the customer for customer satisfaction feedback regarding the first service provider in addressing the problem associated with the performance of the service provided by the first service provider;
    receiving, from the customer, customer satisfaction feedback data; and
    reporting the customer satisfaction feedback data to the first service provider.

7. The system of claim 6, wherein reporting the customer satisfaction data to the first service provider comprises providing, via a service provider interface, a service performance measure corresponding to the customer satisfaction data, and wherein the operations further comprise reporting, via the service provider interface along with the service performance measure, an industry service performance measure associated with the first service industry.

8. A method comprising:
    receiving, at a system comprising a processor from a first service provider, first service provider data, the first service provider data comprising information regarding a service provided by the first service provider, the first service provider corresponding to a first service industry;

receiving, at the system from a second service provider, second service provider data, the second service provider corresponding to a second service industry, wherein the first service industry and the second service industry are different;

receiving, at the system from a customer, service request data identifying a problem associated with a performance of the service provided by the first service provider;

in response to receiving the service request data, reporting, by the system, the service request data to the first service provider and to other customers;

receiving, at the system from the first service provider, a request for support to address the problem associated with the performance of the service provided by the first service provider;

in response to receiving the request, soliciting, by the system, bids from a plurality of service providers to address the problem associated with the performance of the service provided by the first service provider, wherein the second service provider is one of the plurality of service providers; and transmitting, by the system to the customer, a notification message that the problem associated with the performance of the service provided by the first service provider has been resolved.

9. The method of claim 8, wherein the service request data is reported to the first service provider via a service provider interface.

10. The method of claim 9, wherein the service provider interface comprises a window interface including the problem associated with the performance of the service provided by the first service provider, information associated with the customer who provided the service request data identifying the problem, and a date and time when the service request data was received.

11. The method of claim 9, wherein the service provider interface provides an option for communicating with customers of the first service provider via an instant messaging interface.

12. The method of claim 8, further comprising:
 querying the customer for customer satisfaction feedback regarding the first service provider in addressing the problem associated with the performance of the service provided by the first service provider;
 receiving, from the customer, customer satisfaction feedback data; and
 reporting the customer satisfaction feedback data to the first service provider.

13. The method of claim 12, wherein reporting the customer satisfaction data to the first service provider comprises providing, via a service provider interface, a service performance measure corresponding to the customer satisfaction data, and wherein the method further comprise reporting, via the service provider interface along with the service performance measure, an industry service performance measure associated with the first service industry.

14. A non-transitory tangible computer-readable medium storing instructions that, when executed by a system comprising a processor, cause the processor to perform operations comprising:

receiving, from a first service provider, first service provider data, the first service provider data comprising information regarding a service provided by the first service provider, the first service provider corresponding to a first service industry;

receiving, from a second service provider, second service provider data, the second service provider corresponding to a second service industry, wherein the first service industry and the second service industry are different;

receiving, from a customer, service request data identifying a problem associated with a performance of the service provided by the first service provider;

in response to receiving the service request data, reporting the service request data to the first service provider and to other customers;

receiving, from the first service provider, a request for support to address the problem associated with the performance of the service provided by the first service provider;

in response to receiving the request, soliciting bids from a plurality of service providers to address the problem associated with the performance of the service provided by the first service provider, wherein the second service provider is one of the plurality of service providers; and transmitting, to the customer, a notification message that the problem associated with the performance of the service provided by the first service provider has been resolved.

15. The computer-readable medium of claim 14, wherein the service request data is reported to the first service provider via a service provider interface.

16. The computer-readable medium of claim 15, wherein the service provider interface comprises a window interface including the problem associated with the performance of the service provided by the first service provider, information associated with the customer who provided the service request data identifying the problem, and a date and time when the service request data was received.

17. The computer-readable medium of claim 15, wherein the service provider interface provides an option for communicating with customers of the first service provider via an instant messaging interface.

18. The computer-readable medium of claim 14, wherein the operations further comprise:
 querying the customer for customer satisfaction feedback regarding the first service provider in addressing the problem associated with the performance of the service provided by the first service provider;
 receiving, from the customer, customer satisfaction feedback data; and
 reporting the customer satisfaction feedback data to the first service provider.

19. The computer-readable medium of claim 18, wherein reporting the customer satisfaction data to the first service provider comprises providing, via a service provider interface, a service performance measure corresponding to the customer satisfaction data, and wherein the method further comprise reporting, via the service provider interface along with the service performance measure, an industry service performance measure associated with the first service industry.

* * * * *